United States Patent [19]

Seefeldt

[11] Patent Number: 5,744,950
[45] Date of Patent: Apr. 28, 1998

[54] APPARATUS FOR DETECTING THE SPEED OF A ROTATING ELEMENT INCLUDING SIGNAL CONDITIONING TO PROVIDE A FIFTY PERCENT DUTY CYCLE

[75] Inventor: James D. Seefeldt, DeForest, Wis.

[73] Assignee: SSI Technologies, Inc., Janesville, Wis.

[21] Appl. No.: 647,308

[22] Filed: May 9, 1996

[51] Int. Cl.$^6$ .......................... G01P 3/481; G01P 3/489; G01P 33/09; H03K 3/017

[52] U.S. Cl. .......................... 324/166; 324/173; 324/174; 324/207.21; 324/252; 327/175; 327/510

[58] Field of Search ...................... 324/163, 166, 324/173, 174, 207.2, 207.21, 252; 327/175, 510

[56] References Cited

U.S. PATENT DOCUMENTS

| | | | |
|---|---|---|---|
| 3,418,528 | 12/1968 | Junichi Watanabe et al. | |
| 3,732,493 | 5/1973 | Pelkey | 324/166 |
| 3,867,647 | 2/1975 | Callahan et al. | 324/163 X |
| 4,556,886 | 12/1985 | Shimizu et al. | 324/166 X |
| 4,580,047 | 4/1986 | Sasaki et al. | 250/231 |
| 4,914,387 | 4/1990 | Santos | 324/166 |
| 5,068,606 | 11/1991 | Kawate et al. | 324/207.21 X |
| 5,101,155 | 3/1992 | Oehler et al. | 324/166 |
| 5,231,351 | 7/1993 | Kordts et al. | 324/166 |
| 5,287,238 | 2/1994 | Baumgart et al. | 324/252 X |
| 5,293,125 | 3/1994 | Griffen et al. | 324/173 |
| 5,574,364 | 11/1996 | Kajimoto et al. | 324/207.21 X |

OTHER PUBLICATIONS

Okuyama et al; "Magneto–transport phenomena . . . with two magnetic components", *Journal of Magnetism and Magnetic Materials* 113 (1992) pp. 79–82.

*Primary Examiner*—Gerard R. Strecker
*Attorney, Agent, or Firm*—Michael, Best & Friedrich LLP

[57] ABSTRACT

A sensor for determining the rotational speed of a rotating element. The sensor includes a giant magnetoresistive ratio sensing device which is magnetically coupled to the rotating element and includes an output terminal. The sensing device generates an output signal at the output terminal having a frequency corresponding to the rotational speed of the rotating element. A wave-shaping circuit is connected to the output terminal for receiving the output signal and for generating a digital switching signal having a frequency equal to the frequency of the output signal. A frequency divider has an input connected to the wave shaping circuit for receiving the digital switching signal. The frequency divider generates, in response to the digital switching signal, a square wave output having a 50% duty cycle and a frequency equal to the frequency of the digital switching signal divided by a predetermined divisor.

19 Claims, 3 Drawing Sheets

APPARATUS FOR DETECTING THE SPEED OF A ROTATING ELEMENT INCLUDING SIGNAL CONDITIONING TO PROVIDE A FIFTY PERCENT DUTY CYCLE

BACKGROUND OF THE INVENTION

The invention relates to a vehicle including a sensor for determining the angular speed of a rotating element. More particularly, the invention relates to the use of a giant magnetoresistive ratio sensing device and signal conditioning circuit to generate an electrical signal having a 50% duty cycle.

A common method to sense the speed of a rotating element is to use either a magnetoresistive or Hall effect sensing device magnetically coupled to a tone wheel having a plurality of teeth disposed on its outer circumference. The tone wheel is attached to the rotating element and the sensing device, along with a permanent magnet, are mounted so that they are stationary with respect to the rotating element. The sensing device generates a signal consisting of a series of electrical pulses that are a response to the changing magnetic field generated by the permanent magnet and the rotation of the tone wheel. One signal pulse is generated as each tooth in the tone wheel rotates past the sensing device. The signal from the sensing device is then appropriately conditioned to produce a rectangular wave signal having a frequency equal to the rate at which the teeth in the tone wheel pass by the sensing device. The conditioned signal is then conveyed to an electronic control unit for further processing.

SUMMARY OF THE INVENTION

Generally, both the magnetoresistive and Hall effect sensing devices used in conjunction with a tone wheel generate an electrical signal comprising a series of pulses wherein one pulse is generated with the passage of each tone wheel tooth. However, the resulting signal conveyed to the electronic control unit has a non-50% duty cycle. This occurs because the duty cycle of the electrical signal is dependent on such factors as spacing of the tone wheel teeth, temperature, and the size of the gap between the tone wheel and sensing device. Varying operating conditions therefore result in changes in duty cycle of the signal fed to the electronic control unit.

For some applications, it is desirable to provide to the electronic control unit an electrical signal comprising a series of pulses, one pulse per tone wheel tooth, wherein the signal has a 50% duty cycle. A signal having a 50% duty cycle is desirable because the potential for degradation of the signal during transmission over long paths is minimized. Additionally, such a signal minimizes the likelihood that the electronic control unit will mistakenly perceive a phase shift to be a frequency shift or vice versa.

Giant magnetoresistive resistors are relatively new in the art. Giant magnetoresistive resistors are constructed of thin films of ferromagnetic material alternately sandwiched together with intermediate spacing material. The spacing material typically comprises a nonferromagnetic transition metal or a nonmagnetic conductive alloy.

The resistance of a giant magnetoresistive resistor varies with changes in the magnetic field intensity, decreasing with increases in magnetic field intensity. The resistors have sufficiently large resistance values in the absence of a magnetic field such that the resistors are satisfactorily used in a Wheatstone bridge configuration with standard excitation voltages. The resulting giant magnetoresistive ratio (GMR) sensing devices have a magnetoresistive sensitivity coefficient greater than or equal to that of standard magnetoresistive devices. GMR sensing devices may be operated with a high degree of linearity and slight hysteresis. Also, the fabrication of GMR devices is compatible with mainstream semiconductor processing methods making it possible to incorporate signal conditioning circuitry on the same semiconductor chip as the GMR devices themselves.

Additionally, it is possible to restrict the operating range of a GMR sensing device such that the device operates in a bipolar manner. This means that for an applied magnetic field intensity of a given magnitude, both field directions (positive and negative) result in the same output from the GMR sensing device. In comparison, the operating range of a magnetoresistive sensing device is restricted to a linear portion in the first quadrant of the graph of voltage output versus magnetic field intensity.

The resulting bipolar nature of an appropriately biased GMR sensing device thus translates into two pulses being generated at the output of the GMR device with the passage of each tone wheel tooth. The invention provides a signal conditioning circuitry which divides the frequency of the GMR output signal by two, resulting in an electrical signal comprising a series of pulses, one pulse per tone wheel tooth, wherein the signal has a 50% duty cycle.

A principal advantage of the invention is the provision of a GMR sensor for determining the speed of a rotating element including a signal conditioning circuit for producing an output signal having a 50% duty cycle.

Other features and advantages of the invention will become apparent to those of ordinary skill in the art upon review of the following detailed description, claims, and drawings.

DESCRIPTION OF THE PREFERRED EMBODIMENT

Figure 1:
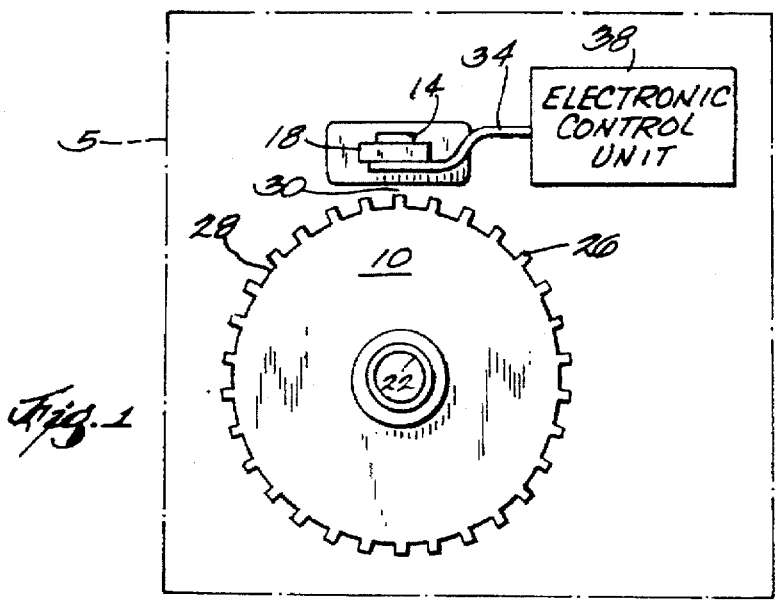
FIG. 1 is a schematic view illustrating the arrangement of a tone wheel, sensor, permanent magnet, and electronic control unit.

Illustrated in FIG. 1 is a vehicle 5 having a tone wheel 10, a permanent magnet 14, and a sensor 18. Although any type of magnetically permeable material is appropriate, tone wheel 10 is preferably constructed of cold rolled steel and includes a circular cutout 22 for mechanically mounting tone wheel 10 on a rotating element such as the rotating wheel or axle of a vehicle or the rotating elements of a vehicle transmission. While the invention is described in the context of a wheeled vehicle, the invention is equally applicable for detecting the rotational speed of any rotating element having a tone wheel. Tone wheel 10 has a plurality of teeth 26 disposed on its outer circumference 28. Sensor 18 is mounted in the wheel bearing (not shown) adjacent a permanent magnet 14 of approximate size 4.0 mm by 2.5 mm so as to allow the magnetic field produced by magnet 14 to interact with tone wheel 10 as it rotates. Suitable mounting arrangements for the magnet and sensor are well known in the art. In the preferred embodiment, a gap 30 of approximately four millimeters is maintained between sensor 18 and tone wheel 10. The output of sensor 18 is connected by electrically conductive wires or connecting cables 34 to an electronic control unit 38 which provides further processing of the output signal from sensor 18.

Figure 2:
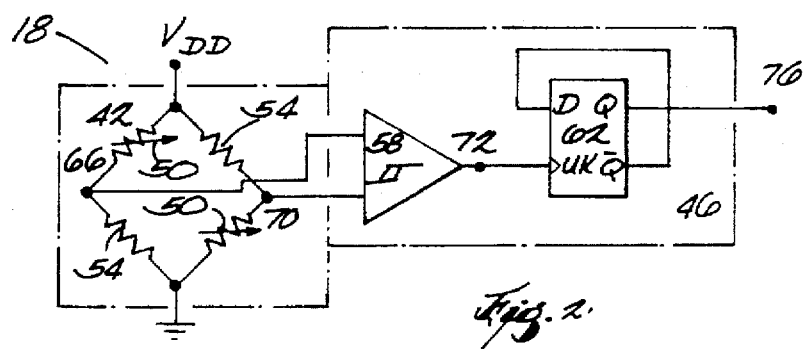
FIG. 2 is a schematic view of the GMR sensing device and signal conditioning circuit.

Sensor 18 is further illustrated in FIG. 2 and includes a GMR sensing device 42 and signal conditioning circuit 46. In the preferred embodiment, GMR sensing device 42 and signal conditioning circuit 46 are fabricated on the same chip.

The GMR sensing device 42 includes two active giant magnetoresistive resistors 50 and two inactive shielded resistors 54 arranged in a half-active Wheatstone bridge configuration. Preferably, the resistance change of active resistors 50 is approximately 1% over the range of magnetic field intensity change (approximately 30 oersteds before magnetic saturation occurs). For a bridge supply voltage of 5 Volts, a 25 millivolt bridge output is produced over the given range of magnetic field intensity. A suitable GMR sensing device 42 is available from NonVolatile Electronics, Inc. of Eden Prairie, Minn.

The signal conditioning circuit 46 of sensor 18 includes a Schmitt trigger 58 and D-type, edge triggered flip-flop 62. The Schmitt trigger 58 shapes the differential voltage output signal from the sensing device 42 at nodes 66 and 70 into a digital signal at node 72. Similar wave shaping components, such as a comparator, could also be used in place of Schmitt trigger 58.

Node 72 is connected to the clock input of the D-type flip-flop 62. The Qbar output of flip-flop 62 is connected to the D input of the flip-flop such that the frequency of the signal at the Q output (node 76) is one half the frequency of the digital signal from Schmitt trigger 58 at node 72. It is also contemplated that any circuit capable of dividing the frequency of a signal by two could be used in place of flip-flop 62.

Figure 3:
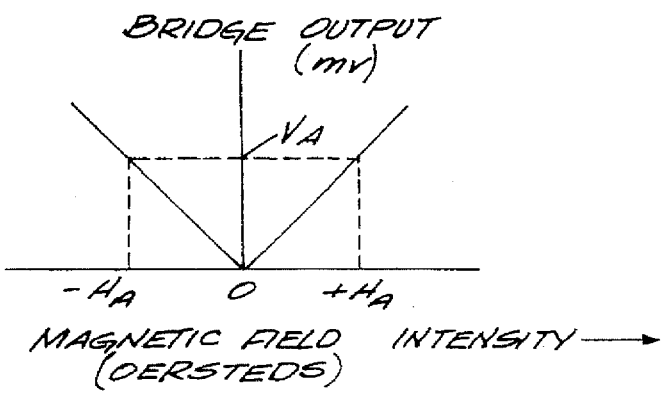
FIG. 3 illustrates the output bridge voltage versus applied magnetic field intensity for the GMR sensing device.

FIG. 3 depicts a graph of the voltage output signal from the Wheatstone Bridge versus the intensity of the magnetic field passing through the sensing device 42. The graph illustrates the bipolar nature of the GMR sensing device. As Shown in FIG. 3, an applied magnetic field intensity of $+H_A$ results in voltage $V_A$ at the output of the sensing device. Likewise, an applied magnetic field intensity of $-H_A$ also results in voltage $V_A$ at the output of the sensing device.

Figure 4:
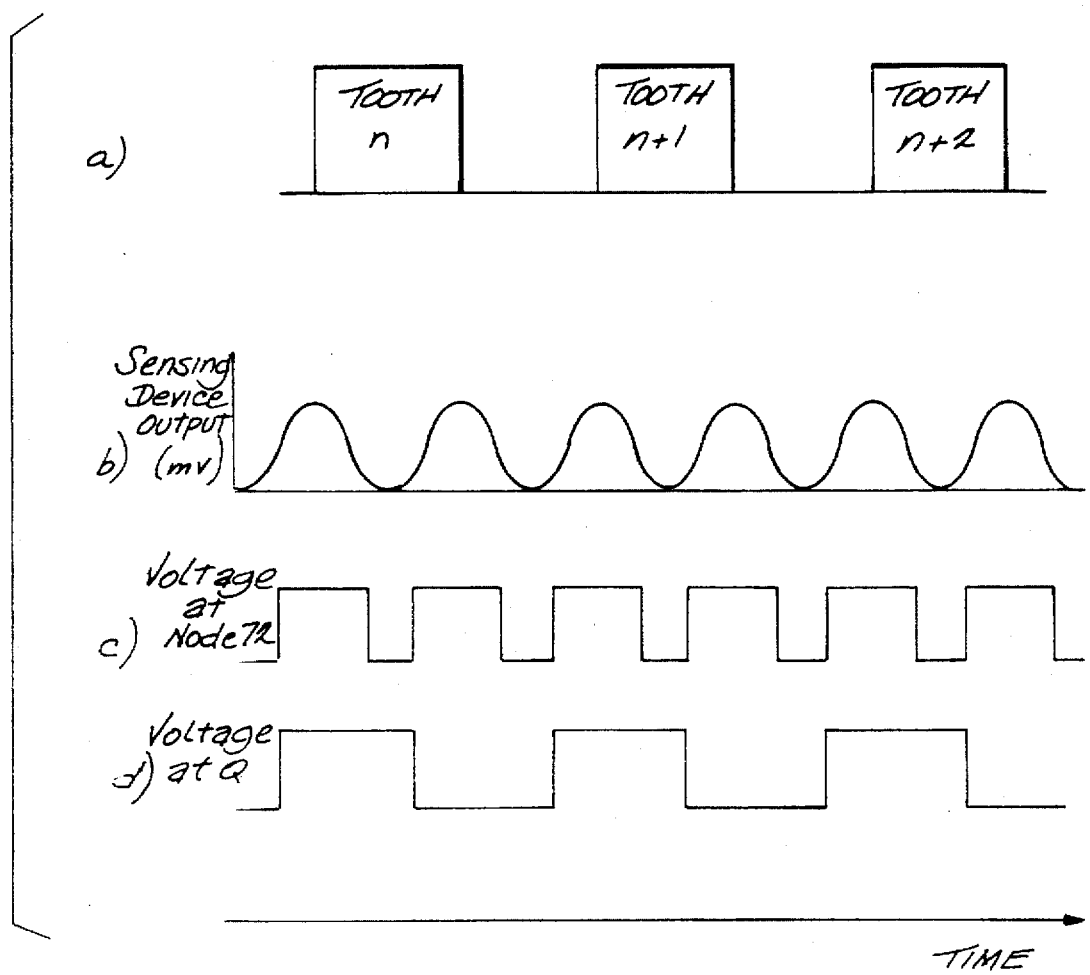
FIG. 4 shows timing diagrams for various points in the circuit of FIG. 2.

The general operation of the sensor can best be explained with reference to the timing diagrams illustrated in FIG. 4. FIG. 4a depicts the position of successive tone wheel teeth relative to the sensor versus time, and provides a baseline for the following diagrams. As each tone wheel tooth (n, n+1, etc.) rotates past sensor 18, the tooth modulates the magnetic field produced by permanent magnet 14. GMR sensing device 42 responds to changes in magnetic field intensity in a direction transverse to the radial direction of the tone wheel. Sensing device 42 produces a differential voltage output between node 66 and node 70 which varies with time as illustrated in FIG. 4b. As shown, the signal from sensing device 42 consists of two pulses generated with the passage of each tone wheel tooth. Thus, the frequency of the differential signal between nodes 66 and 70 is equal to the angular speed of the rotating element (measured in rotations per second) multiplied by the number of teeth multiplied by two.

FIG. 4c illustrates the digital signal output from Schmitt trigger 58, while FIG. 4d illustrates the resultant signal from the flip-flop's Q output at node 76. Flip-flop 62 operates to divide the frequency of the digital signal from the Schmitt trigger 58 by two. The resultant signal at node 76 thus has a 50% duty cycle, with a frequency equal to the frequency of the rotating element multiplied by the number of teeth of the tone wheel. The duty cycle is generally unaffected by changes in gap spacing, temperature, or speed of the rotating element.

Figure 5:
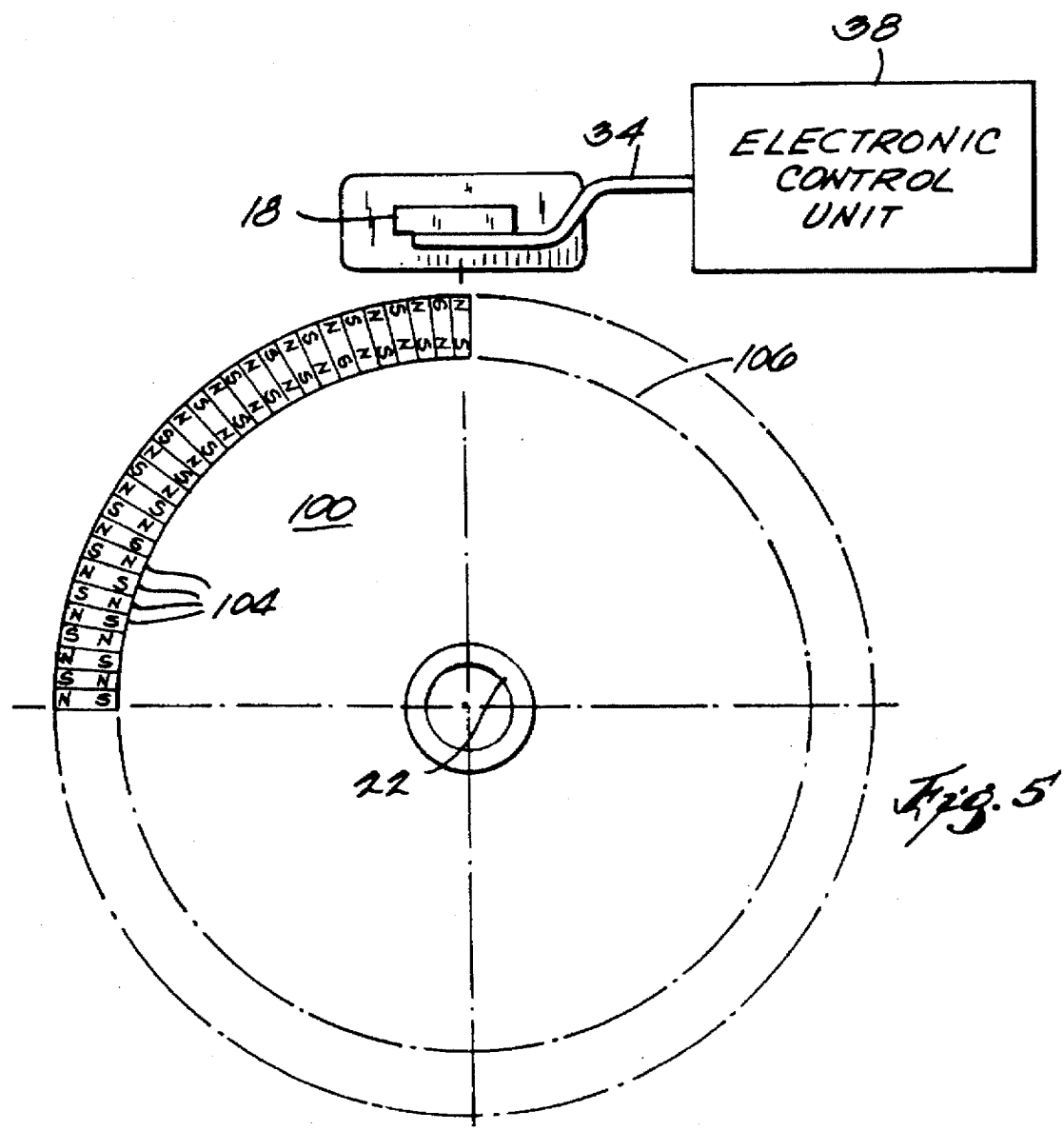
FIG. 5 illustrates the arrangement of a magnetized encoder wheel and sensor.

FIG. 5 illustrates another embodiment of the invention. Like parts are identified using like reference numerals. Shown in FIG. 5 is the physical arrangement of a magnetized encoder wheel 100, sensor 18, and an electronic control unit 38 connected to the sensor 18. Encoder wheel 100 has a number of polarized magnetic segments 104 distributed in a regular and alternating manner around the outer circumference 106 of wheel 100. While the encoder wheel shown in FIG. 5 is a radial read encoder wheel, i.e., the poles of the magnetized regions are radially aligned, an axial read encoder wheel, i.e., with axially aligned poles, can also be used. The magnetic field intensity sensed by the sensing device 42 varies as encoder wheel 100 rotates with the rotating element (not shown) in a similar manner to that previously described.

Various other features and advantages of the invention are set forth in the following claims.

What is claimed is:

1. A sensor for determining the rotational speed of a rotating element, said sensor comprising:

a tone wheel mounted on the rotating element, said tone wheel having a predetermined number of teeth, a giant magnetoresistive ratio sensing device magnetically coupled to said tone wheel and including an output terminal, said sensing device generating an output signal at said output terminal having a frequency corresponding to at least twice the rotational speed of the rotating element multiplied by the number of teeth;

a wave-shaping circuit connected to said output terminal for receiving said output signal and for generating a digital switching signal having a frequency equal to the frequency of said output signal; and a frequency divider having an input connected to said wave shaping circuit for receiving said digital switching signal, said frequency divider generating, in response to said digital switching signal, a square wave output signal indicative of the rotational speed of the rotating element, having a 50% duty cycle and a frequency equal to the frequency of said digital switching signal divided by a predetermined divisor, wherein said predetermined divisor is greater than or equal to two.

2. A sensor as set forth in claim 1 wherein said giant magnetoresistive ratio sensing device includes four resistors arranged in a Wheatstone bridge configuration.

3. A sensor as set forth in claim 1 wherein said predetermined divisor is equal to two.

4. A sensor as set forth in claim 1 wherein said output signal is an electrical output signal having a frequency twice the frequency of the rotating element.

5. A sensor as set forth in claim 1 wherein said wave-shaping circuit includes a bistable pulse generator.

6. A sensor as set forth in claim 1 wherein said wave-shaping circuit includes a comparator.

7. A sensor as set forth in claim 1 wherein said wave-shaping circuit includes a Schmitt trigger.

8. A sensor as set forth in claim 1 wherein said digital switching signal has a non-50% duty cycle.

9. A sensor as set forth in claim 1 wherein said frequency divider includes a type "D" edge triggered flip-flop having a clock input connected to said digital switching signal, a D input, a Q output, and a Qbar output connected to the D input of said flip-flop, said flip-flop generating at the Q output said square wave signal.

10. A sensor for determining the rotational speed of a rotating element, said sensor comprising:

a tone wheel mounted on the rotating element, said tone wheel having a predetermined number of teeth, a giant magnetoresistive ratio sensing device including an output terminal, said sensing device generating a first electrical output signal at said output terminal having a frequency corresponding to at least twice the rotational speed of the rotating element multiplied by the number of teeth;

a bistable pulse generator connected to said output terminal for receiving said first electrical output signal and for generating a second electrical output signal in response to said first electrical output signal, said second electrical output signal comprising a pulsed signal having a frequency equal to the frequency of said first electrical output signal and having a duty cycle that is not a 50% duty cycle; and a type "D" edge triggered flip-flop having a clock input connected to said second electrical output signal, a D input, a Q output, and a Qbar output connected to the D input of said flip-flop, and said flip-flop generating at said Q output a third electrical output signal having a 50% duty cycle and having a frequency corresponding to the rotational speed of the rotating element multiplied by the number of teeth.

11. A sensor as set forth in claim 10 wherein said third electrical output signal has a frequency equal to the frequency of said second electrical output signal divided by two.

12. A sensor for determining the rotational speed of a rotating element, said sensor comprising:

an encoder wheel mounted on the rotating element, said encoder wheel having a predetermined number of polarized magnetic segments, a giant magnetoresistive ratio sensing device magnetically coupled to said encoder wheel and including an output terminal, said sensing device generating an output signal at said output terminal having a frequency corresponding to at least twice the rotational speed of the rotating element multiplied by the number of magnetic segments;

a wave-shaping circuit connected to said output terminal for receiving said output signal and for generating a digital switching signal having a frequency equal to the frequency of said output signal; and a frequency divider having an input connected to said wave shaping circuit for receiving said digital switching signal, said frequency divider generating, in response to said digital switching signal, a square wave output signal indicative of the rotational speed of the rotating element, having a 50% duty cycle and a frequency equal to the frequency of said digital switching signal divided by a predetermined divisor, wherein said predetermined divisor is greater than or equal to two.

13. A sensor as set forth in claim 12 wherein said giant magnetoresistive ratio sensing device includes four resistors arranged in a Wheatstone bridge configuration.

14. A sensor as set forth in claim 12 wherein said predetermined divisor is equal to two.

15. A sensor as set forth in claim 12 wherein said output signal is an electrical output signal having a frequency twice the frequency of the rotating element.

16. A sensor as set forth in claim 12 wherein said wave-shaping circuit includes a Schmitt trigger.

17. A sensor as set forth in claim 12 wherein said wave-shaping circuit includes a comparator.

18. A sensor as set forth in claim 12 wherein said digital switching signal has a non-50% duty cycle.

19. A sensor as set forth in claim 12 wherein said frequency divider includes a type "D" edge triggered flip-flop having a clock input connected to said digital switching signal, a D input, a Q output, and a Qbar output connected to the D input of said flip-flop, said flip-flop generating at the Q output said square wave signal.

* * * * *